Figure 1:
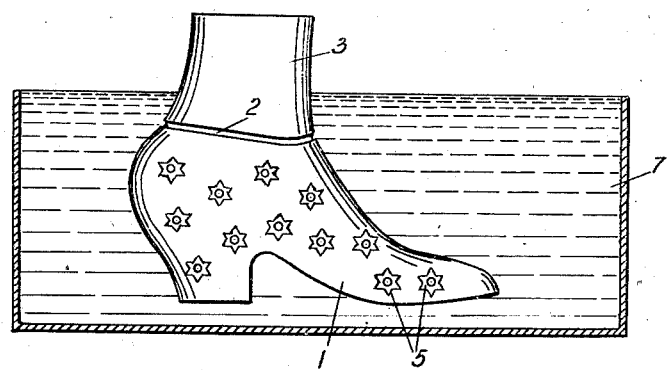

July 1, 1947.  E. GOTTSCHALK  2,423,143
MANUFACTURE OF ORNAMENTED RUBBER ARTICLES
Filed Nov. 23, 1944

INVENTOR.
EMIL GOTTSCHALK
BY
ATTORNEY

Patented July 1, 1947

2,423,143

UNITED STATES PATENT OFFICE 2,423,143

MANUFACTURE OF ORNAMENTED RUBBER ARTICLES

Emil Gottschalk, New York, N. Y.

Application November 23, 1944, Serial No. 564,876

1 Claim. (Cl. 18—58)

The invention relates to the manufacture of ornamented rubber articles and particularly ornamented rubber shoes.

Various methods have been devised to solve the problems which arise in this art.

According to the one known method Gossamer shaped ornaments are applied to rubber bathing caps by depositing on a mold a rubber dispersion in the shape of fine threads; to prevent the spreading or stringing out of the thus produced thread-shaped embellishments the form is coated with a non-wetting substance, such as for instance wax or paraffin.

In conformity with another rubber shoe decorating process component parts of the shoe are deposited from an aqueous rubber dispersion on engraved metal anode plates suspended from a hanger which is connected to the positive terminal of the source of the current. After the thus produced ornamented parts have acquired the desired thickness, they are dried and united with a fabric support, a suitable lining or a similar reinforcing element which is pressed into adhesive engagement with the rubber parts. The various ornamented components are then assembled upon a shoe molder last together with a sole and a heel element.

The final article, therefore, is composed of a plurality of individual parts and involves the shortcomings thereof; besides, this manufacturing method is very complicated.

These advantages are obviated by those methods where, as in the instant case, the rubber shoe is produced as an integral body by repeatedly dipping a shoe mold into a liquid latex compound until an article of sufficient thickness is formed. The thereby produced rubber body is dried on the mold, vulcanized and removed therefrom as a finished article.

In conformity with the dipping method ornamented rubber shoes are produced by applying, for instance painting, the embellishing ornaments on the finished dipped articles from a spreadable latex compound and vulcanizing the same, thereby firmly uniting the ornaments and the shoe.

It is also known to first apply ornaments from liquid latex compounds to a mold and then dip the mold in a latex solution, thus producing the ornamented article and then vulcanizing the same.

In conformity with still another process ornamented rubber objects are produced by forming a latex deposit designed to produce the ornamentation of the entire form and then forming by subsequent deposition a secondary deposit over the first deposit which outlines a desired ornamentation, masks being applied to the first deposit so as to make it visible through the second deposit.

However, in all these methods where the ornaments are formed on a mold from liquid latex compounds the grave difficulty inevitably arises that the ornaments independently of the manner of their production and in spite of the use of non-wetting mold coatings string out, spread out and flow together; instead of the desired distinctly contoured ornaments irregular and distorted latex blotches result, which render the treated articles unusable for commercial purposes. Moreover, it is apparent that the application of non-wetting coatings to the molds which must be continuously repeated greatly complicates the work.

It is the primary object of the invention to produce ornamented rubber articles by the latex dipping or depositing method where the ornaments fully preserve the intended outlines, contours and shape.

It is another object of the invention to accomplish this aim without pretreating or coating the depositing mold.

It is also an object of the invention to manufacture properly ornamented rubber articles in an exceedingly simple manner and under avoidance of the hitherto customary complications and difficulties.

It is another advantage of the invention that it is not restricted to the application of simple ornaments, such as dots or rings, but permits the creation of any variety of artistic embellishments.

It is a further object of the invention to embed the ornaments in the finished articles and to integrally unite the same in a manner which increases and individualizes the embellishing effect.

With these and other objects in view which will become apparent as this specification proceeds, the invention is described therein in several embodiments.

As previously mentioned, the rubber articles and particularly rubber shoes to be ornamented in accordance with the invention are produced by deposition on a mold from latex solutions or dispersions, which deposition is obtained by repeated dippings. The deposited rubber body is dried, eventually cured, vulcanized and removed from the mold.

The particular manner of applying ornaments to the rubber articles in accordance with this invention is now described in the following in connection with the manufacture of rubber shoes.

(1) The contours or the components of the ornament to appear on the shoe are marked on the shoe mold or shoe last with a pencil, a pen or in any other suitable manner; this marking might be omitted if the ornaments consist of very simple designs.

A thread or a filament, for instance a fabric thread or a rubber thread, is impregnated with a liquid rubber or latex compound, for instance by dipping; the latex compound will be colored if colored ornaments are to be produced. The thread saturated or coated with the rubber or latex compound is now affixed to the mold in such a manner that the desired ornament is formed from the thread. The previously mentioned marking of the contours or parts of the ornament on the mold will further the forming of the ornament in a true manner.

Due to the adhesiveness of the rubber or latex compound the ornament thus built on the mold from the latex or rubber compound carrying thread will strongly adhere to the mold immediately upon application to it of the thread. The thus applied ornament is dried on the mold; the latter is now dipped into a latex compound to form thereon the shoe body in the usual manner, which is then vulcanized and pulled off the mold by turning the same inside out. It represents the finished article to which the ornament is applied without distortion or irregularity, because true shape consistency is preserved by building the ornament from the impregnated thread and avoidance of spreading or running off of the liquid latex compound.

(2) The ornament to appear on the rubber shoe is made of a fabric, of paper, of rubber or any other material adapted to be impregnated or coated with the preferably colored liquid latex compound. This ornament is then dipped into an adhesive latex compound, impregnated or coated therewith and hereupon applied to the mold in the same manner as described under 1. It may happen that fine interstices of the ornaments are filled with the viscous rubber or latex compound. In this case an air stream is blown through the ornament, which will remove the latex from the interstices, as otherwise the true reproduction of the ornament on the shoe would suffer.

In mass production it will be advisable to arrange a great number of fabric or paper or the like ornaments as a one-piece article which is supported in a frame and to sever therefrom the individual ornaments to be saturated, impregnated or coated with the liquid latex or rubber compound.

The invention is illustrated in its application for the production of ornamented rubber shoes in the accompanying drawings.

Figure 2:
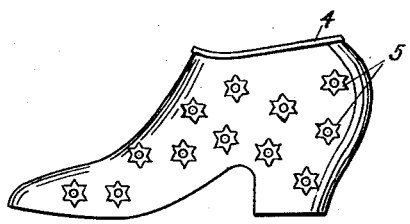

Fig. 1 shows a shoe mold with ornaments applied thereto immediately after the mold has been dipped into the latex bath, the latter being shown in a vertical elevation, Fig. 2 shows the finished article.

The mold 1 shown in Fig. 1 has an annular groove 2 encircling its upper part 3 to form reinforcing rib 4 in the finished article shown in Fig. 2. The mold is shown after being dipped into the latex bath 7.

The mold is covered with star-shaped ornaments 5; these ornaments are formed on mold 1 from a cotton thread which has been previously impregnated with an adhesive colored latex solution.

The cotton thread may be replaced by threads or filaments of other materials adapted to absorb or to be coated with liquid latex or rubber compounds.

Upon all ornaments 5 being affixed to the mold 1 in this manner, the same is dipped into the liquid latex bath 7 and the rubber shoe is produced on the ornament carrying mold in the customary manner by repeated dippings and final vulcanization.

The finished shoe is stripped from the mold by turning the same inside out, the ornaments 5 firmly adhering to the same and now appearing at its outside.

The same procedure is followed if the ornaments instead of being formed from threads consist of fabric or other material adapted to be impregnated or coated with colored liquid latex compounds. Also in this case the shape consistency and accuracy of the ornaments is assured, because unintended distortion of the ornaments is prevented by the threads or ornaments carrying the liquid latex and confining the same to the exact shape of the desired ornamentation.

It will be obvious to those skilled in the art that variations of this process may be made which fall within the scope of this invention without departing from the spirit thereof.

I claim:

Method for the manufacture of ornamented rubber shoes comprising impregnating a liquid absorbent thread made of a textile material with a liquid latex compound, forming from the impregnated thread on a mold the contours of the ornaments to appear on the shoe and simultaneously securing the thus produced ornament upon the mold by the adhesive action of said rubber compound, dipping the mold into liquid latex, forming the shoe on the mold and uniting the thus formed shoe and the ornament by vulcanization.

EMIL GOTTSCHALK.

REFERENCES CITED

The following references are of record in the file of this patent:

UNITED STATES PATENTS

| Number | Name | Date |
| --- | --- | --- |
| 1,867,880 | Crockett | July 19, 1932 |
| 1,867,881 | Crockett | July 19, 1932 |
| 2,029,379 | Hollier et al. | Feb. 4, 1936 |